United States Patent
Lamb (10) Patent No.: US 10,838,447 B2
(45) Date of Patent: *Nov. 17, 2020

(54) METHOD AND APPARATUS FOR PROVIDING ENERGY DEVICE AND SYSTEM STATUS

(71) Applicant: ECOLINK INTELLIGENT TECHNOLOGY, INC., Carlsbad, CA (US)

(72) Inventor: Michael Lamb, Rancho Santa Fe, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,328

(22) Filed: Apr. 19, 2019

(65) Prior Publication Data

US 2019/0317538 A1 Oct. 17, 2019

Related U.S. Application Data (60) Division of application No. 15/991,458, filed on May 29, 2018, now Pat. No. 10,268,225, which is a continuation of application No. 14/834,233, filed on Aug. 24, 2015, now Pat. No. 9,983,612, which is a continuation of application No. 13/467,930, filed on Jul. 2, 2012, now Pat. No. 9,118,220.

(51) Int. Cl.
*H02J 13/00* (2006.01)
*G05F 1/66* (2006.01)
*G05B 15/02* (2006.01)

(52) U.S. Cl.
CPC .............. *G05F 1/66* (2013.01); *G05B 15/02* (2013.01); *H02J 13/0086* (2013.01)

(58) Field of Classification Search
CPC ........ G05F 1/66; G06F 1/3215; G06F 1/3243; G05B 15/02; G05B 13/08; G08B 25/00; G08B 25/14; G08B 27/003; H02J 13/0068; H02J 13/0086
USPC ....... 340/500, 501, 517, 528, 531, 540–542, 340/545.1, 545.8, 545.9, 573.4; 713/300, 713/301, 320, 323
See application file for complete search history.

(56) References Cited

U.S. PATENT DOCUMENTS

| | | | |
|---|---|---|---|
| 4,023,151 A | 5/1977 | Markham | |
| 5,861,806 A | 1/1999 | Vories et al. | |
| 7,196,623 B1 | 3/2007 | Wang | |
| 8,063,775 B2 | 11/2011 | Reed | |
| 8,456,293 B1 | 6/2013 | Trundle | |
| 9,489,812 B2 * | 11/2016 | Beagley | G08B 13/19 |
| 2008/0183307 A1 | 7/2008 | Clayton et al. | |
| 2010/0289643 A1 | 11/2010 | Trundle et al. | |
| 2011/0043362 A1 | 2/2011 | Reibel | |

(Continued)

*Primary Examiner* — Hung T Nguyen
(74) *Attorney, Agent, or Firm* — Greenberg Traurig, LLP (57) ABSTRACT

A method and apparatus is described for providing energy system status information. A status indication device may be mounted near an entry door for determining when an individual is about to leave an area. When the status indication device determines that an individual is about to leave an area, it displays an energy status to the individual, so that the individual can decide whether to place energy-consuming devices in a conservation mode of operation.

20 Claims, 5 Drawing Sheets

(56) References Cited

U.S. PATENT DOCUMENTS

| | | | |
|---|---|---|---|
| 2012/0065802 A1* | 3/2012 | Seeber | H04W 4/38 |
| | | | 700/295 |
| 2012/0117503 A1 | 5/2012 | Hofrichter et al. | |
| 2014/0316581 A1 | 10/2014 | Fadell et al. | |
| 2016/0189531 A1 | 6/2016 | Modi et al. | |
| 2016/0217638 A1* | 7/2016 | Child | H04L 12/2827 |
| 2017/0082994 A1* | 3/2017 | Gu | G06Q 10/06 |

* cited by examiner

METHOD AND APPARATUS FOR PROVIDING ENERGY DEVICE AND SYSTEM STATUS

I. CROSS-REFERENCE TO RELATED APPLICATIONS

This application is a divisional of U.S. patent application Ser. No. 15/991,458, filed on May 29, 2018, now U.S. Pat. No. 10,268,225, which is a continuation of U.S. patent application Ser. No. 14/834,233, filed on Oct. 24, 2015, now U.S. Pat. No. 9,983,612, which is a continuation of U.S. patent application Ser. No. 13/467,930, filed on Jul. 2, 2012, now U.S. Pat. No. 9,118,220.

BACKGROUND

I. Field of Use

The present application relates to the field of security and energy management systems. More specifically, the present application relates to providing energy device and system status information to individuals.

II. Description of the Related Art

Security systems for homes and offices have been around for many years. Typically, these systems comprise a central control device in communication with one or more door/window sensors, motion detectors, sound detectors, light detectors, etc., to detect unauthorized entry. If an unauthorized entry is detected, the central control device may cause an alarm to be sounded locally and/or contact a remote monitoring station that can send police to the location. The central control device is also typically in communication with a keypad/display device that allows information to be sent to the central control device, such as a security disarm code, while also displaying information provided by the central control device, such as system status and/or individual sensor information.

Energy management systems have also become popular over the past several years. Such systems typically comprise a central energy management device in communication with one or more local energy management devices that are capable of controlling energy-consuming devices connected to the energy management devices. The central energy management device may instruct the local energy management devices to supply power to, or remove power from, the energy-consuming devices that they are connected to. In addition, these energy management systems typically allow information pertaining to energy use to be sent over the Internet, so that it may be viewed by utility companies and/or home/business owners and, additionally, allow remote control of energy-consuming devices.

One problem that exists in prior art security systems and energy management systems is that only one control unit and/or keypad/display is provided so that the security and/or energy status of a home or business may not be available at each entry/exit door. Thus, an individual leaving a home or business must approach the control unit where it is installed to know the system status.

Another problem is that individuals may not want to arm the security system each time that they leave the premises, because setting the security system into "alarm-away" mode is, essentially, placing the security system into a "high alert" mode. An individual may not want or need the security system to operate in such a high state of alert if the individual is, for example, going to the corner market in the middle of the day.

Thus, it would be desirable to operate security systems in a way that provides individuals more choices than simply having the security system in a "high alert" mode or disarmed each time that the individual leaves his or her home or office. In addition, it would be helpful to be able to provide information pertaining to security and energy management systems to individuals as they leave a home or business through any door.

SUMMARY

The embodiments described herein relate to a method and apparatus for providing energy device and system status information. In one embodiment, a method for providing energy status reporting by a status indication device comprises receiving a status of a first device managed by an energy management device, determining that an individual is leaving an area, in response to determining that an individual is leaving the area, determining a simplified energy status based on at least the status of device, and displaying the simplified energy status in response to determining that the individual is leaving the area.

In another embodiment, a method for providing energy status reporting by a status indication device in communication with a central security control module comprises determining that an individual is leaving an area, in response to determining that the individual is leaving the area, sending a status request to the central energy management device, receiving a response from the central energy management device comprising an energy status based on at least the status of at least one device being managed by the central energy management device, and providing an indication of the energy status.

In yet another embodiment, an apparatus is described for providing energy status reporting in communication with an energy management device, comprising, a user interface for displaying a simplified energy status to an individual, a memory for storing processor-executable instructions, and a processor electronically coupled to the user interface and the memory that, when executing the processor-executable instructions, perform the following actions: receive a status of a first device managed by the energy management device, determine that an individual is leaving an area, determine a simplified energy status based on at least the status of the first device, and in response to determining that an individual is leaving the area, provide an indication of the simplified energy status to the user interface.

In yet still another embodiment, an apparatus is described for providing energy status reporting in communication with a central energy management device, comprising, a user interface for displaying an energy status to an individual, a memory for storing processor-executable instructions, and a processor electronically coupled to the user interface and the memory that, when executing the processor-executable instructions, perform the following actions: determine that an individual is leaving an area, in response to determining that the individual is leaving the area, send a status request to the central energy management device, receive a response from the central energy management device comprising an energy status based on at least the status of at least one device being managed by the central energy management device, and provide an indication of the energy status to the user interface.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present disclosure relates to methods and apparatus for security and/or energy management status and control. In one embodiment, a status indicator provides status of either individual security sensors distributed throughout a home or business, and/or energy-consuming devices in a home or business. In another embodiment, the status indicator may provide an overall status of a security system and/or energy management system. In yet another embodiment, the status indicator may provide control of security sensors and/or energy-consuming devices, either directly or through a security system and/or energy management system.

Figure 1:
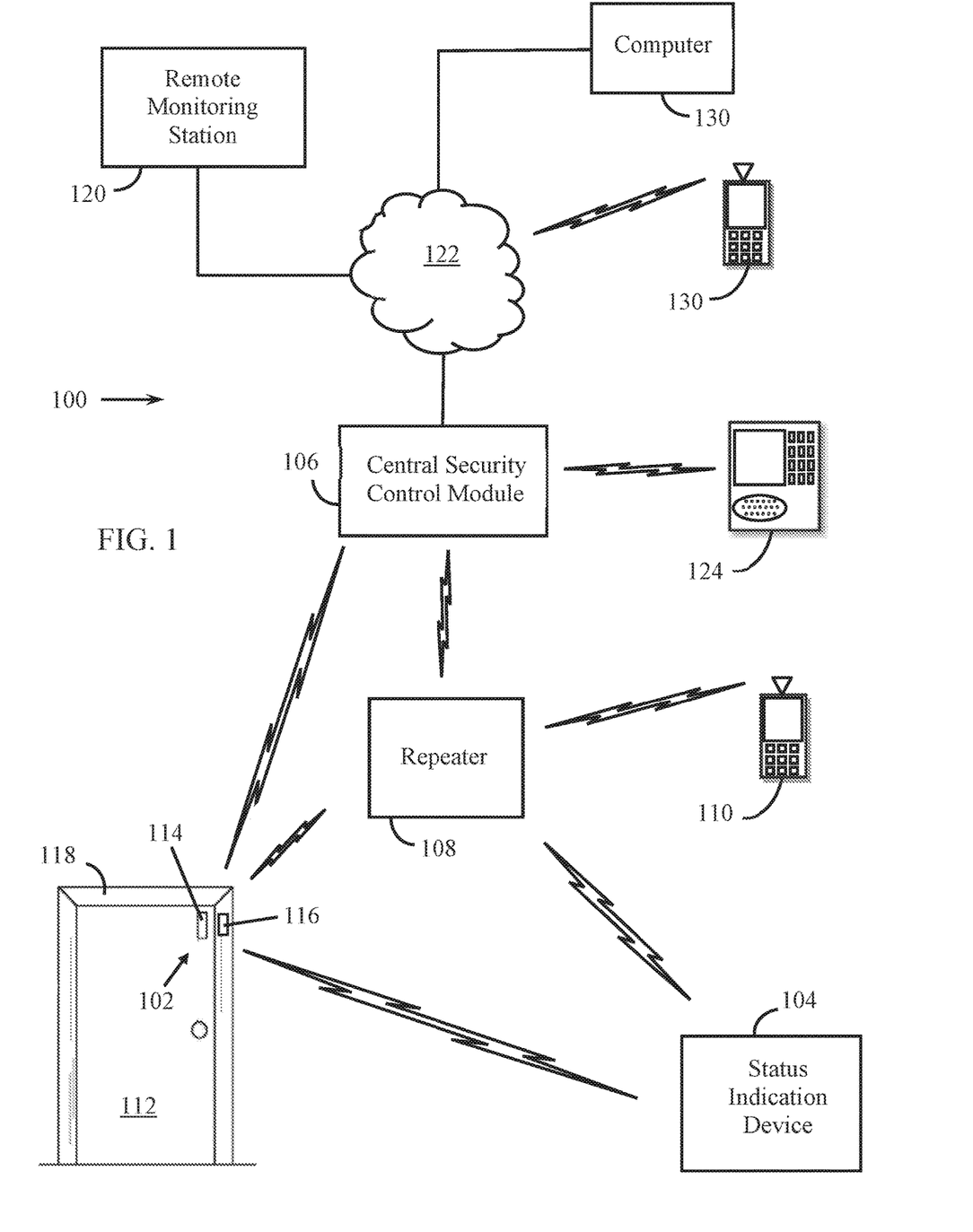
FIG. 1 is an illustration of a security system, including a status indication device.

FIG. 1 is an illustration of one embodiment of a security system 100 comprising sensor 102, a status indication device 104, an optional central security control module 106, an optional repeater 108, and an optional local security system remote control 110. Sensor 102 comprises, in this embodiment, a magnetic door sensor comprising a magnet 114 mounted to door 112 and reed switch assembly 116 mounted to door frame 118, commonly used in home security systems for monitoring door or window status, e.g., whether a door or window is open or closed.

Although FIG. 1 shows security system 100 comprising only one sensor, it typically comprises multiple sensors, each one monitoring a respective point of entry to a structure, such as a door or window, to determine its status (e.g., "open" or "closed", "locked" or "unlocked", etc.). Alternatively, or in addition, other sensor types could be used in security system 100, such as a non-magnetic door/window sensor, a motion detector, an infrared sensor, a sound detector, a still or video camera, a tilt sensor, and/or other security monitoring devices.

In one embodiment, the security sensors communicate with central security control module 106, either wirelessly as shown, or by a wired connection. For example, messages may be sent to central security control module 106 from sensors indicating a status of monitored points of entry. Central security control module 106 receives these messages and may take one or more actions depending on the status of the various points of entry. For example, if door 112 is opened, reed switch assembly 116 detects a reduction or elimination of a magnetic field produced by magnet 114 as magnet 114 moves away from reed switch assembly 116. In response, reed switch assembly 116 transmits a message to central security control module 106 indicative of a status change, e.g., that door 112 has been opened. In response central security control module 106 may cause an audible siren to sound and/or notify central monitoring station 120 that a change in state of one of the sensors and/or points of entry has occurred.

In some embodiments, central security control module 106 sends messages to sensor 102 requesting a status of the sensor and, implicitly, the status of a point of entry being monitored, in this case door 112. In response, sensor 102 transmits a response to central security control module 106 indicating a door status, such as "open", "closed", "locked", or "unlocked". Other commands may be transmitted by central security control module 106, such as "sound alarm", "turn on lights", open gate, lock doors, etc. In response, sensor 102 would cause a device, such as a loudspeaker, lights, motors, etc. to perform the command.

As described above, central security control module 106 performs monitoring of sensors in system 100 and typically provides this status information to an electronic display located on central security control module 106. The display provides a visual indication of the status ("open", "closed", "on", "off", "normal", "armed", "alarm", "locked", "unlocked", etc.) of one or more sensors in the system as well as an identification and/or location of the sensors, or only sensors that indicate an "open" status.

In many systems, central security control module 106 may send and receive information to/from a remote keypad/display unit 124, used as a convenient interface for individuals to access central security control module 106. This may be desirable due to central security control module 106 typically being installed in a discreet location, such as a closet or other remote location. Central security control module 106 may send general status information of the security system to keypad/display unit 124, such as "armed", "disarmed", "armed-home", and/or a status of one or more doors, windows, or other items being monitored. Such status may include an identification of one or more doors or windows, their location, and whether they are open, closed, locked, and/or unlocked, etc.

Central security control module 106 may also be in communication with an off-site remote monitoring station 120 via communication network 122, such as the Internet, PSTN, a fiber optic communication network, wireless communication network (e.g., cellular, data, satellite, etc.), and/or other wide-area network. Remote monitoring station 120 typically provides "live" security monitoring services for homes and businesses equipped with security systems such as the one shown in FIG. 1. Remote monitoring station 120 is adapted to receive communications from central security control module 106 via network 122 in response to central security control module 106 determining that a local alarm condition (e.g., door or window opened, movement detected, infrared detected, light beam interrupted, light turned on or off, etc.) has been detected by one or more sensors in security system 100. In other embodiments, central security control module 106 simply receives raw data from the sensors and determines, based on the data, whether a local alarm condition has occurred. When a local alarm condition is detected, central security control module 106 generates a system alarm which may comprise taking one or more actions, such as notifying remote monitoring station 120 that a local alarm condition has occurred, illuminating one or more lights, sounding one or more audible alerts, transmitting one or more commands to various sensors to perform an action, such as sound an alarm, turn on a light, lock a door or window, etc.

In one embodiment, central security control module 106 may be operated via a keypad mounted to central security control module 106, which allows a user of the security system to enter information into the central security control module 106, such as a command to arm or disarm the system, to determine a status of one or more sensors, to add, modify, or remove sensors from the system, etc. Users may, alternatively or in addition, provide information to, and receive information from, central security control module 106 via local security system remote control 110 (such as a custom keyfob, smartphone, tablet computing device, or other mobile computing device) and/or a remote device 130 (such as a fixed or portable computer, smartphone, tablet computing device, or other mobile computing device) via a wireless or wired communication channel with network 122.

Central security control module 106 may additionally communicate with status indication device 104 to convey status information of one or more sensors in the security system and/or an overall status of the security system. Status indication device 104 comprises an electronic device that provides a convenient audio and/or visual indication of the status of the sensors and/or overall system status to individuals as they enter or leave a home or business. Status indication device 104 is typically battery-operated and mounted on a door frame or wall nearby a door, typically a door that provides entry to a home or business. In one embodiment, status indication device comprises an illumination device, such as one or more light-emitting diodes, or other low-power illumination devices, to indicate a status to an individual. For example, in one embodiment, status indication device 104 comprises a red LED that is illuminated when security system 100 is armed and a green LED that is illuminated when security system 100 is disarmed. In another embodiment, a yellow LED may be used in conjunction with the red and green LEDs to indicate that one or more doors or windows are open, or that motion has been recently detected in an area being monitored by a motion detector.

Status indication device 104 may additionally comprise means for sending commands to central security control module 106, or directly to one or more of the sensors, for instructing central security control module 106 and/or the one or more sensors to perform one or more acts, such as sounding an audible alarm, turning one or more lights on or off, locking a door or window, closing blinds, etc. Such means typically comprises one or more pushbuttons located on status indicator 104.

In one embodiment, status indication device 104 receives status information as it is transmitted by central security control module 106. However, this may require that status indication device 104 be in an active receiving mode for long time periods. Thus, in other embodiments, status indication device 104 may receive status information at predefined time intervals that synced to transmissions by central security control module 106. In another embodiment, status information is transmitted by central security control module 106 in response to receiving a message transmitted by status indication device 104, requesting status information from central security control module 106. The status request message may be transmitted at regular time intervals, at random time intervals, or upon the occurrence of a predetermined event. In one embodiment, the predetermined event comprises detecting the presence of an individual in the vicinity of status indication device 104. In another embodiment, the predetermined event comprises detecting that an individual is, or has, entered or left an area, room, home, or business. In another embodiment, the predetermined event comprises receiving an audible command from an individual. In some of these embodiments, status indication device 104 comprises a motion detector or infrared detector for determining whether one of the predetermined events mentioned above has occurred.

In any of the just-described embodiments, an individual may receive a real-time status of security system 100 automatically, either at the system level or individual sensors, as the individual enters or leaves an area, room, home, or business. After receiving the status from status indication device 104, the individual may use status indication device 104 to arm or disarm the entire security system, or one or more individual sensors, or to have some other action performed.

Thus far, one embodiment of a security system has been described, comprising sensor 102 in communication with central security control module 106, which, in turn, is in communication with central monitoring center 120, remote device 130, and/or status indication device 104. In another embodiment, however, sensor 102 communicates with repeater 108, rather than directly with central security control module 106, due to, for example, sensor 102 located outside of the sensor's and/or central security control module 106's communication range. Repeaters are commonly known for receiving electronic signals and re-transmitting them in situations where a sensor is located too far from central security control module 106 for signals to be received. Repeater 108 typically comprises a receiver for receiving wireless signals and a transmitter for re-sending the signals, or data within the received signals, wirelessly to either another repeater or to central security control module 106. The use of multiple repeaters is commonly used, sometimes creating what is known as a "mesh" network, where each repeater acts as a "node" and each node communicates with other nodes within range of one another. One or more of the repeaters, including repeater 108, may, additionally, be associated with a sensor so that each sensor is capable of transmitting a status associated with an item being monitored by the sensor, as well as receiving transmissions from other sensors and re-sending these transmissions to other repeaters and/or directly to central security control module 106.

In one embodiment, repeater 108 comprises translation hardware, software, and/or firmware used to receive electronic signals transmitted and/or encoded using one communication protocol and re-transmit information in the received electronic signals in a different encoding and/or communication protocol. For example, sensor 102 may transmit door status information using the popular Z-wave communication protocol, but central security control module 106 may only receive signals transmitted in accordance with, for example, the popular IEEE 802.11(n) wireless networking standard. In this case, repeater 108 may be used to allow communications between sensor 102 and central security control module 106 to occur.

In one embodiment, repeater 108 may communicate directly with status indication device 104, whether sensor 102 and status indication device 104 are not within range of each other or whether sensor 102 and status indication device 104 communicate using different communication encoding/communication protocols. For example, sensor 102 may provide a status of door 112 via repeater 108 upon the occurrence of a predetermined event, such as when the door is opened or closed. The status signal is received by repeater 108 and the information in the status signal is transmitted to status indication device 104. Status indication device 104, in turn, may illuminate one or more LEDs or other visual device indicative of the status received from sensor 102.

In yet another embodiment, one or more sensors in security system 100 communicate directly with status indication device 104. In this embodiment, central security control module 106 and/or repeater 108 may be absent from the system, whereby status indication device 104 simply receives status signals from one or more sensors and provides an indication to an individual of the status of the sensors as a whole by determining a simplified security status, or the status of individual sensors/entry points in the system. Status indication device 104 may, additionally, be capable of sending transmissions to one or more of the sensors, instructing them to perform one or more actions or functions, such as turning a light on or off, turning a siren on or off, locking a door or window, operating a motor to open or close blinds, etc.

Figure 2:
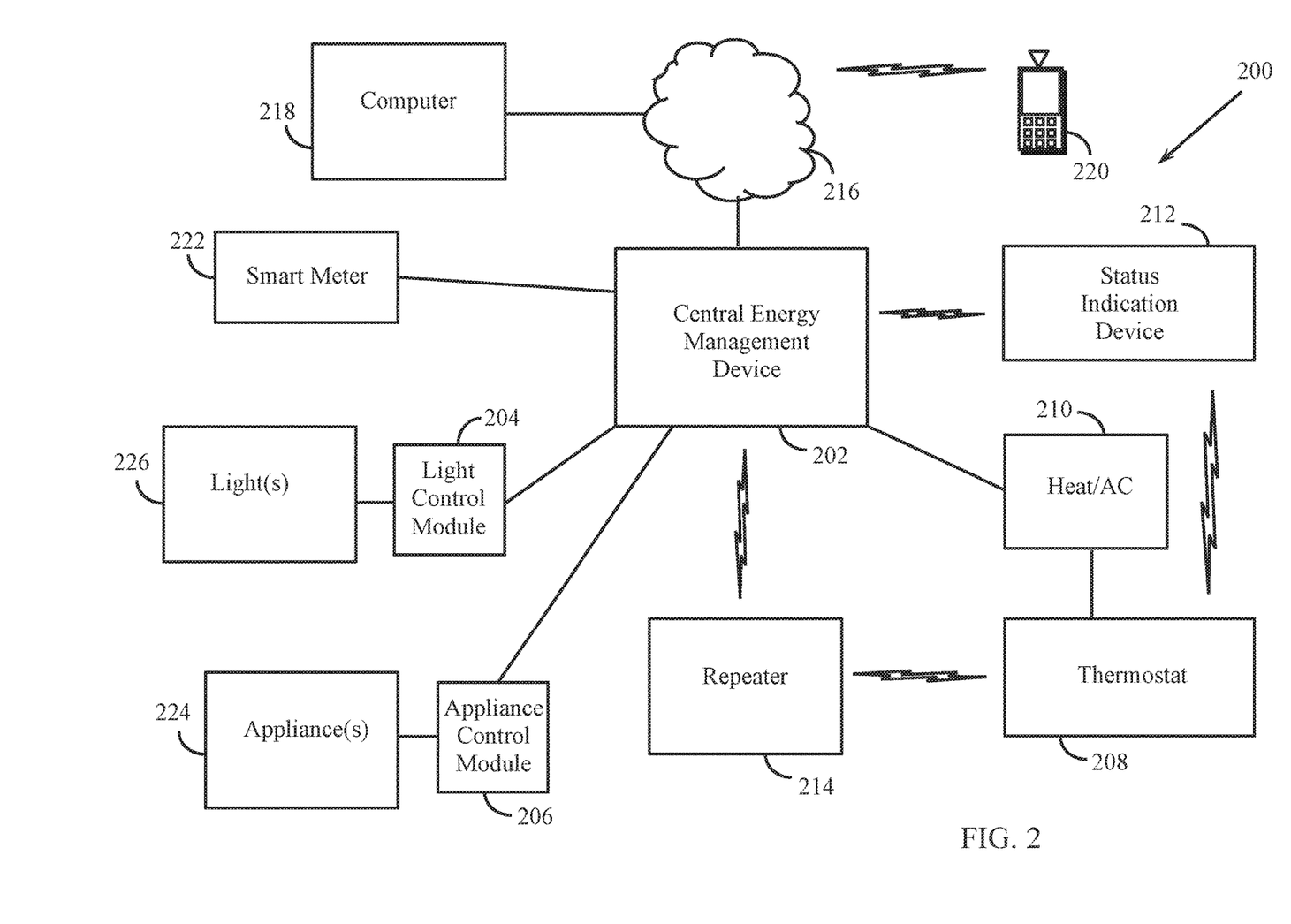
FIG. 2 is an illustration of one embodiment of an energy management system, including a status indication device.

FIG. 2 is an illustration of one embodiment of an energy management system 200 comprising a central energy management device 202, status indication device 212, and one or more local energy management devices, such as smart meter 222, lighting control module 204, appliance control module 206, and thermostat 208. The local energy management devices control operation, or report status, of energy-consuming devices, such as one or more lights 226, one or more electric appliances 224, and/or other energy-consuming devices. Heating and/or air conditioning system 210 is typically controlled by thermostat 208, which in turn may receive instructions from central energy management device 202 that control operation of heating and/or air conditioning system 210. Also shown is repeater 214, network 216, remote computer 218, and remote wireless communication device 220. It should be understood that FIG. 1 is merely representative of one embodiment of an energy management system, and that in other systems, a greater or fewer number and type of components may present. Energy management systems are presently available that monitor and/or control home and business energy consumption. For example, General Electric Company, headquartered in Schenectady, N.Y., sells the Nucleus™ home energy management system, which provides appliance monitoring and heating/cooling control, among other things.

Central energy management device 202 typically provides centralized monitoring and/or control of the various devices in the energy management system. It typically communicates with these devices via wireless signals conforming to one of any number of popular wireless communication protocols, and/or via wired connections, such as twisted pair or AC powerline communications.

In one embodiment, central energy management device 202 may receive status information from one or more of the devices indicating a present state of operation of an item being controlled by each device. For example, central energy management device 202 may receive one or more messages from heating/air conditioning system 210 indicating that the heater is a particular state, such as heating, cooling, fan on/off, etc. In another example, central energy management device 202 may receive one or messages from lighting control module 204 indicating the status of one or more lights or group of lights, such as ON or OFF, dimmed, a set time when one or more lights or light groups are due to turn on or off, etc.

Central energy management device 202 may also receive information from smart meter 222 indicating various parameters regarding energy use in a home or business, or in a home or business subsystem, such as a pool pump or electric vehicle charging station. Smart meter 222 may provide information such as a present energy consumption rate, an average energy consumption rate, a breakdown of how various electric devices have consumed energy in the past or are presently consuming energy, a present or past cost associated with past or present energy consumption, etc. An example of smart meter 222 is the Openway® Centron® smart meter manufactured by Itron, Incorporated, of Liberty Lake, Wash.

Central energy management device 202 can typically also send messages to one or more of the devices shown in FIG. 2. For example, central energy management device 202 may send a command to lighting control module 204 instructing lighting control module 204 to turn one or more lights 226 on or off. It may be capable of sending messages to one or more appliances instructing the appliances to perform an act, such as lowering a refrigerator temperature, making extra ice, turning an oven on to a given temperature, turning an oven off, etc., via appliance control module 206. It may instruct thermostat 208 to adjust a temperature set point, adjust a set time when heat or air conditioning is due to turn on, perform an action such as turn heat or air conditioning on or off, turn a fan on, etc.

Both appliance control module 206 and lighting control module 204 typically comprises a 120 VAC male connector, allowing each unit to plug into a standard AC socket found in most present-day homes and businesses. They further comprise a 120 VAC female connector whose power is controlled by a processor and receive combination, for controlling lights and/or appliances from central energy management device 202. An example of such a control module is a Z-wave wireless lighting control outdoor module, manufactured by General Electric Corporation, headquartered in Fairfield, Conn.

Status indication device 212 comprises an electronic device that provides a convenient audio and/or visual indication of the status of individual devices and/or overall energy system status to individuals as they enter or leave a home or business. Status indication device 212 is typically battery-operated and mounted on a door frame or wall nearby a door, typically a door that provides entry to a home or business. In one embodiment, status indication device 212 comprises an illumination device, such as one or more light-emitting diodes, or other low-power illumination devices, to indicate a status to an individual. For example, in one embodiment, status indication device 104 comprises a red LED that is illuminated when energy management system is in an "AWAY" mode of operation, and a green LED that is illuminated when energy management system 100 is in a "HOME" mode of operation. Central energy management device 202 may be enter into one or more of these modes of operation, each mode comprising pre-determined operating points relating to one or more devices in the system. For example, an AWAY mode of operation may cause the devices in the system to minimize power consumption in a home, for example when the home is unoccupied. In this mode of operation, control module may send a command to thermostat 208 instructing that it lower a current temperature set point (for example, during cold weather), or to turn off the thermostat completely, and/or to turn one or more lights off and/or other lights on (to deter burglaries, for instance), and/or to arm security system 100. The HOME mode of operation may cause may cause the devices in the system to set devices to operate in conformance with one or more people occupying a home. For example, in this mode of operation, control module may send a command to thermostat 208 instructing it raise a current temperature set point (for example, during cold weather), or to turn the thermostat on, and/or to turn one or more lights off and/or other lights on, and/or to disarm security system 100.

To generate messages or commands for transmission to one or more devices in the system, central energy management device 202 may comprise one or more push buttons, switches, touch screen controls, microphones, biometric readers (such as a fingerprint scanner, retina scanner, camera for facial recognition, etc.), or other devices to receive user input and translate the user input into messages or commands. For example, in one embodiment, central energy management device 202 comprises a push button in the shape of a leaf that may be pushed when an individual is leaving home and wishes to place energy management system 100 into an energy-conservation mode. Upon return, the individual may press the leaf push button once more to return energy management system 100 to a normal mode of operation (e.g., HOME). The status of energy management system 100 may be indicated by an LED integrated into the leaf push button, in one embodiment.

In order to transmit messages or commands to the various devices in energy management system 200, status indication device 212 comprises circuitry and/or software/firmware/processor-executable code or instructions for generating and transmitting these messages or commands using one or more communication protocols. For example, status indication device 212 may comprise the necessary hardware and software for communicating with central energy management device 202 using the popular Zwave communication protocol, while additionally comprising the necessary hardware and software to communicate with some of the devices in energy management system 200 directly, such as thermostat 208 using the well-known 802.11(n) communication protocol.

In one embodiment, status indication device 212 may receive information from central energy management device 202 and/or other device in energy management system 200 at any time. However, this may require that status indication device 212 be in an active receiving mode for long time periods. Thus, in other embodiments, status indication device 212 may receive information from central energy management device 202 and/or other devices at predefined time intervals. In another embodiment, information is provided by central security control module 106 in response to receiving a command from status indication device 212 to transmit status or other information related to energy management system 200. The command may be transmitted at regular time intervals, at random time intervals, or upon the occurrence of a predetermined event. In one embodiment, the predetermined event comprises detecting the presence of an individual in the vicinity of status indication device 212. In another embodiment, the predetermined event comprises detecting that an individual is, or has, entered or left an area, room, home, or business. In another embodiment, the predetermined event comprises receiving an audible command from an individual. In some of these embodiments, status indication device 212 comprises a motion detector or infrared detector for determining whether one of the predetermined events mentioned above has occurred.

In any of the just-described embodiments, an individual may receive a real-time status of energy management system 200 automatically, either at the system level or relating to one or more individual devices in energy management system 200, as the individual enters or leaves an area, room, home, or business. After receiving the status from status indication device 212, the individual may use status indication device 212 to change one or more settings relating to one or more devices in energy management system 200, either through control module 201 and/or by directly communicating with one or more devices.

Figure 3:
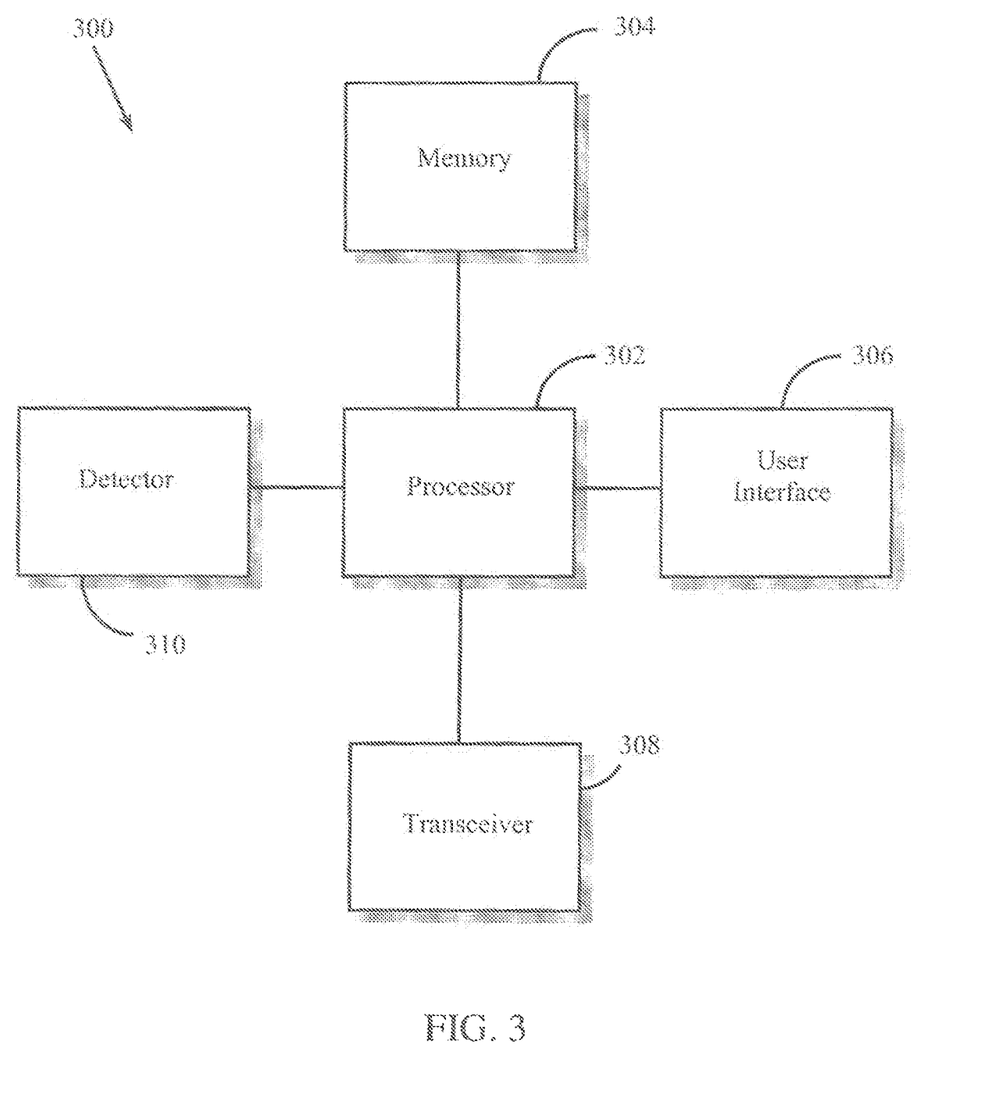
FIG. 3 is a functional block diagram of the status indication device of either FIG. 1 or FIG. 2.

FIG. 3 is a functional block diagram of one embodiment of a status indication device 300. In this embodiment, status indication device 300 comprises hardware/software/firmware needed to support the functionality of both status indication device 104 and status indication device 212, as discussed with respect to FIGS. 1 and 2, respectively. Specifically, FIG. 3 shows processor 302, memory 304, user interface 306, transceiver 308, and detector 310. It should be understood that the functional blocks shown in FIG. 3 may be connected to one another in a variety of ways, and that not all functional blocks necessary for operation of status indication device 300 are shown (such as a power supply), for purposes of clarity.

Processor 302 is configured to provide general operation of status indication device 300 by executing processor-executable instructions stored in memory 304, for example, executable code. Processor 302 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively.

Memory 304 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 304 is used to store the processor-executable instructions for operation of status indication device 300 as well as any information used by processor 302 during operation of status indication device 300, such as information regarding one or more devices in system 100 and/or 200, parameter information, identification information, status information, etc.

User interface 306 is coupled to processor 302 and allows a user to receive information from status indication device 300 and/or control operation of either security system 100 and/or energy management system 200. User interface 306 may comprise one or more pushbuttons, touchscreen devices, biometric readers, switches, sensors, keypads, and/or microphones that generate electronic signals for use by processor 300 upon initiation by a user. User interface 306 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. In one embodiment, user interface 306 comprises a multi-colored LED indicating a status of security system 100, a multi-colored LED indicating a status of energy management system 200, a first pushbutton for controlling one or more functions of security system 100, and a second pushbutton for controlling one or more functions of energy management system 200.

Transceiver 308 comprises circuitry necessary to transmit and receive communication signals, including messages, commands, status information, requests, etc., between status indication device 300 and central security control module 106, central energy management device 202, repeaters 108 and/or 214, and/or directly with one or more sensors discussed with respect to FIG. 1 or devices discussed with respect to FIG. 2. Such circuitry is well known in the art and may comprise BlueTooth, Wi-Fi, RF, optical, or ultrasonic circuitry, among others. Alternatively, or in addition, transceiver 308 comprises well-known circuitry to provide signals to a remote destination via wiring, such as telephone wiring, twisted pair, two-conductor pair, CAT wiring, AC powerline wires, or other type of wiring.

Detector 310 comprises any device that is able to detect when an individual is within range of status indication device 300. In one embodiment, this comprises determining if an individual is leaving, about to leave, entering, or about to enter, an area, room, home, business, or other defined area. In one embodiment, detector 310 comprises a motion sensor. In another embodiment, detector 310 comprises a passive infrared sensor. In other embodiments, detector 310 may comprise a light-beam interruption detector, a sonic transducer, or a reed switch.

In an embodiment where detector 310 comprises a motion detector or passive infrared sensor, detector 310 may determine that an individual is approaching status indication device 300 using one of a number of known techniques. In an embodiment where detector 310 comprises a range-determination device, such as an ultrasonic or infrared transducer, detector 310 determines that an individual is approaching status indication device 300 by performing multiple distances calculations between an individual and status indication device 300. If the successive distance calculations are diminishing, it indicates that an individual is approaching status indication device 300 and, thus, about the leave an area, room, etc.

Status indication device typically uses a limited power supply, such as a replaceable battery, to provide power to the various components necessary for operation of the functional blocks shown in FIG. 3. Thus, processor 302 is configured, via the executable code stored in memory 304, to consume as little power as practical while still performing its intended function. This may be achieved, for example, by allowing detector 310 to operate normally, e.g., be able to detect an individual within range of status indication device 300, but preventing signals from being transmitted or received by transceiver 308, and/or operating a display that is part of user interface 306 in a low or no-power state. Upon detection of an individual within range of detector 310, processor 302 may provide a status to the display and/or transmit and/or receive messages via transceiver 308.

Figure 4:
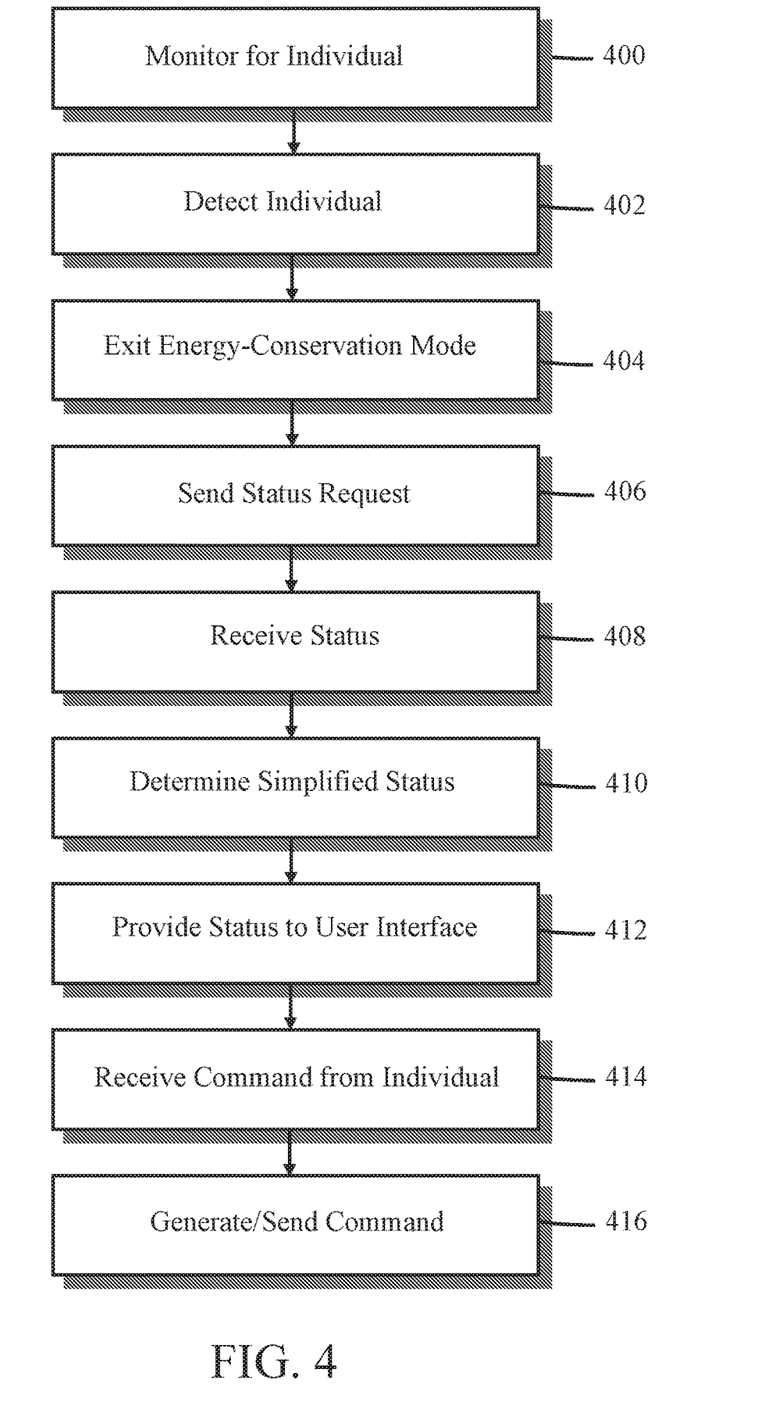
FIG. 4 is a flow diagram illustrating one embodiment of a method for providing security and/or energy status and/or control.

FIG. 4 is a flow diagram illustrating one embodiment of a method for providing security and/or energy status and/or control. In this embodiment, a status indication device may comprise functionality of both status indication device 104 and status indication device 212, as discussed with respect to FIGS. 1 and 2, respectively. It should be understood that in some embodiments, not all of the steps shown in FIG. 4 are performed. It should also be understood that the order in which the steps are carried out may be different in other embodiments.

At block 400, a status indication device monitors for the presence of an individual within range of the status indication device. Any one or a combination of technologies may be used to make this determination. For example, the status indication device may comprise a motion sensor, IR detector, camera, microphone, and/or supporting circuitry/software/firmware to make the determination, as is well-known in the art. The status indication device typically operates in an energy-conservation mode of operation during this time, e.g., user interface 306 is not illuminated and/or transceiver 308 is non-functional, processor 302 operating in a "hibernation" mode of operation, etc.

At block 402, the status indication device determines that an individual has been detected within range of the status indication device. Typically, processor 302 receives information from one or more motion-detection sensors (e.g., IR sensor, camera, passive IR, microphone, etc.) and provides the information to processor 302, where processor 302 performs an analysis of the signals received from the one or more sensors in accordance with processor-executable instructions stored in memory 304. In another embodiment, the one or more sensors comprise an on-board processor for detecting the presence of an individual and provide a signal indicative of such detection to processor 302.

In one embodiment, determining that an individual has been detected within range of the status indication device comprises determining that one of the sensors described with respect to FIG. 1, in communication with the status indication device, has changed state. This embodiment is used when the status indication device does not have the capability of detecting the presence of an individual itself. For example, door sensor 102 may be installed onto a home front door and a status detection device mounted to a wall adjacent to the door such that user interface 306 is visible to individuals as they enter or leave a home through the door. When a change of state of door state is detected by door sensor 102 (e.g., detecting that the door has been opened, or detecting that the door state changed from closed to open, then back to closed, within a predetermined time period, indicating an exit or arrival of an individual through the door), an indication of the change may be transmitted from sensor 102 to central security control module 106 indicating the detected state change, either wirelessly or via a wired connection. When the status indication device receives the status message(s) from sensor 102, it determines that an individual has been detected within range of the status indication device.

In another embodiment, determining that an individual has been detected within range of the status indication device comprises determining that an individual has left or is in the process of leaving a room, area, home, business, or other defined area. In this embodiment, a motion sensor or other sensor within the status indication device determines that an individual is moving towards the status indication device in an embodiment where the status indication device is mounted near an entry/exit door.

In another embodiment, alternatively (or in addition) to the embodiment discussed above, determining that an individual has left or is in the process of leaving a room, area, home, business, or other defined area comprises, first, determining that an entity is approaching an entry or exit door using a motion sensor, motion detector, IR sensor, microphone, camera, etc., and, subsequently, detecting that the entry or exit door has opened and then closed. In one embodiment, the time between when the door is opened until the time it is closed is compared to a predetermined time period, for example, five seconds. If the door is opened and closed within the predetermined time period, it is an indication that an individual approached the entry/exit door, opened the door, exited through the door, and then closed the door behind him or her.

In yet another embodiment, alternatively (or in addition) to the embodiments discussed above, determining that an individual has left or is in the process of leaving a room, area, home, business, or other defined area comprises, first, determining that an entity is approaching an entry or exit door using a motion sensor, motion detector, IR sensor, microphone, camera, etc., and, subsequently, detecting that the entry or exit door has opened within a predetermined time period from when the entity is detected approaching the entry or exit door. For example, in one embodiment, the predetermined time period is set to three seconds, so that when a door sensor sends a signal indicative of a door opening within three seconds of determining that an individual is leaving an area, the status indication device determines that an individual is leaving, or about to leave, the area.

In yet still another embodiment, alternatively (or in addition) to the embodiments discussed above, determining that an individual has been detected within range of the status indication device comprises determining that an individual has arrived or is about to arrive at a room, area, home, business, or other defined area. For example, in one embodiment, a motion sensor, or similar sensor, located within the status indication device may detect an object moving away from an entry/exit door and/or status indication device. In another embodiment, the status indication device first determines that that an entry or exit door has opened, then closed (or, alternatively, only that the door has been opened). Then, the status indication device determines whether an object is moving away from the door and/or status indication device, using any of the techniques described above. If the status indication device determines that the entry/exit door has been opened and then closed, and then determines that an object is moving away from the door and/or status indication device, a determination is made that an individual has entered a room, area, home, business, or other defined area through the entry/exit door. In one embodiment, the time between when the door is opened and closed is determined and compared to a predetermined time period to aid in determining whether an individual has arrived. In another embodiment, the time between when the door is opened (or closed) and when an object is detected moving away from the door and/or status indication device is compared to a predetermined time. If this time is less than the predetermined time, it is an indication that an individual as arrived, opened the door and has moved into the room, area, home, business, or other defined area. In one embodiment, the predetermined time is set to five seconds, in order to allow an individual time to open the door, enter a defined area, close the door, and enter the defined area.

At block 404, the status indication device may exit an energy-conservation mode of operation. For example, user interface 306 may become illuminated, transceiver 308 may become operational (e.g., able to send and receive messages), processor 302 entering into an active mode of operation from a "hibernation" mode of operation, etc.

At block 406, in response to determining that an individual has been detected within range of the status indication device, the status determination device transmits a request message to central security control module 106, central energy management device 202, or both, requesting that one or both units provide a status of security system 100 and/or energy management system 200. In another embodiment, additionally or alternatively, the request from the status determination device may request a status of one or more particular sensors or devices in either system.

At block 408, information is received in response to the request message transmitted at block 406, typically in the form of one or more messages by transceiver 308 and provided to processor 302. The information may comprise an overall system status of security system 100 and/or energy management system 200. For example, an overall system status of security system 100 may comprise an indication that the system is armed, disarmed, home-armed, etc. An overall system status of energy management system 200 may comprise an indication that the energy management system is in "active" or "not active" state, that the system is operating in an energy conservation mode of operation, that the system is operating in a normal mode of operation, or some other overall system status. Alternatively, or in addition, the information transmitted by central security control module 106 and/or central energy management device 202 may comprise information regarding one or more sensor and/or device information, such as an identification of one or more sensors and/or devices, and a status corresponding to the one or more sensors and/or devices.

At block 410, in one embodiment, processor 302 determines a simplified security status of either security system 100, energy management system 200, or both. The simplified security status is typically determined if a system status is not available directly from central security control module 106 and/or central energy management device 202. A simplified security status regarding security system 100 may comprise a determination that none of the sensors are reporting an "open" status, e.g., all doors and windows are closed, in which case the simplified security status comprises an "all closed" status. The simplified security status may, alternatively, comprise a determination that none of the one or more doors and/or windows are unlocked open, e.g., all of the monitored doors and/or windows are locked, in which case the simplified security status comprises an "all locked" status. In another embodiment, the simplified security status regarding security system 100 may comprise a determination that at least one door and/or window is open, in which case the simplified security status comprises a "not closed" status. In yet another embodiment, the simplified security status may comprise a determination that at least one door and/or window is unlocked. In another embodiment, the simplified security status comprises a combination of the two just-mentioned conditions, e.g., a determination that all monitored doors and/or windows are closed/not closed and a determination that all monitored doors and/or windows are locked.

A simplified energy status regarding energy management system may comprise a determination that a heating and/or cooling system is on, off, or in one or more predetermined modes, such as "automatic" or "energy conservation". It should be understood that the "on" determination may be made even though the heating/cooling system is not currently active. For example, a heating system may be in a thermostat-controlled "automatic" state, but not blowing warm air at the time the request message is transmitted at block 406, because the ambient air temperature exceeds a thermostat set point. Processor 302 may determine the simplified energy status using information in the response message such as the present operating status of one or more energy-consuming devices (e.g., heating, cooling, on, off, automatic, etc.), one or more parameters associated with one or more energy-consuming devices such as one or more thermostat set points and/or set times (e.g., times when an energy-consuming device will turn on, off, or be placed into an automatic state of operation), a sensed operating condition (such as an ambient air temperature, an oven temperature, an iron temperature, etc.).

At block 412, processor 302 provides the simplified status (security and/or energy) to user interface 306. For example, in one embodiment, processor 302 provides one or more electronic signals that cause one or more LEDs to illuminate or become extinguished. Alternatively, or in addition, processor 302 provides electronic signals that cause an audio output to be generated by user interface 306 indicative of the simplified security/energy status.

In one embodiment, user interface 306 comprises a red LED and a green LED, each indicative of a simplified security status of security system 100. Processor 302 causes the green LED to become illuminated if all doors and windows monitored by sensors are closed, and causes the red LED to become illuminated if one of the monitored doors or windows is open. In another embodiment, user interface 306 comprises a red LED, a yellow LED, and a green LED, each indicative of a simplified energy status of energy management system 200. Processor 302 causes the green LED to become illuminated if at least a portion of energy-consuming devices are operating in an "energy conservation" mode of operation, causes the red LED to become illuminated if at least a portion of the energy-consuming devices are off, and the yellow LED to become illuminated if at least a portion of the energy-consuming devices is operating in a "normal" mode of operation. Of course, many other configurations are possible, using different numbers and types of visual/audio presentation devices.

At block 414, processor 302 receives a signal from user interface 306 from an individual who wishes to cause one or more sensors or devices to perform one or more actions or functions. For example, an individual may, in response to seeing a green LED illuminated on the status indication device indicating that all doors and windows are closed, press a button on the status indication device that generates a signal indicative of the user's intentions.

At block 416, processor 302 generates one or more messages that are sent to one or more sensors and/or devices to cause them to perform a particular action or function. For example, a message may be generated by processor 302 and transmitted to central security control module 106 that causes central security control module 106 to arm security system 100, e.g., sound an alarm and/or alert central monitoring station 120 if an alarm condition occurs. Additionally, or alternatively, in another embodiment, the message generated by processor 302 and transmitted to central energy management device 202 may that cause central energy management device 202 to place energy management system 200 into a "conservation mode" of operation, e.g., placing setting thermostat 208 to a set point of 68 degrees F. in the winter months so that ambient room temperature does not exceed 68 degrees and/or closing or opening electronically-controlled blinds or window shades, turning lights on or off, etc.

Figure 5:
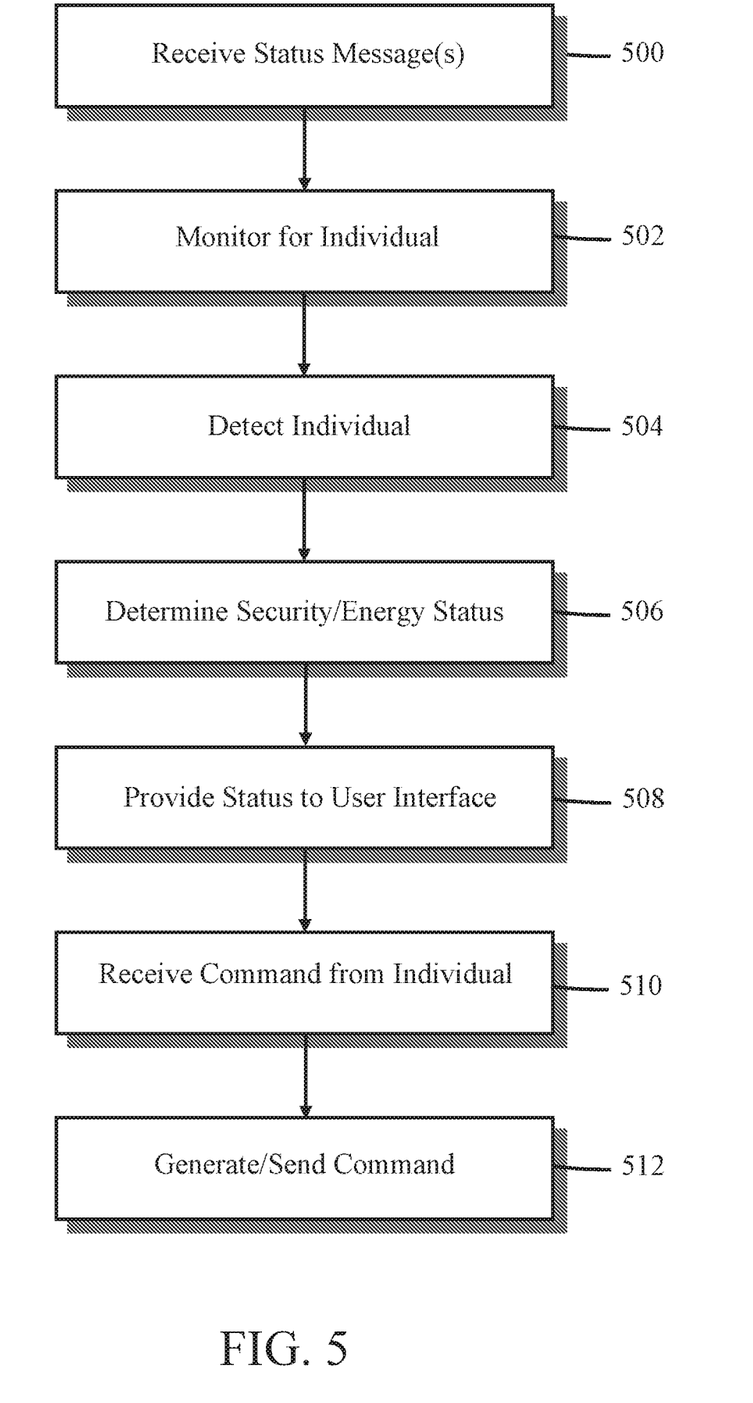
FIG. 5 is a flow diagram illustrating another embodiment of a method for providing security and/or energy status and/or control.

FIG. 5 is a flow diagram illustrating another embodiment of a method for providing security and/or energy status and/or control. In this embodiment, a status indication device may comprise functionality of both status indication device 104 and status indication device 212, as discussed with respect to FIGS. 1 and 2, respectively. It should be understood that in some embodiments, not all of the steps shown in FIG. 4 are performed. It should also be understood that the order in which the steps are carried out may be different in other embodiments.

At block 500, a status indication device receives one or more status messages from one or more sensors, as shown in FIG. 1, or devices, as shown in FIG. 2, indicating a status of a point of entry (or other monitored item or place) or a status of an energy-consuming device, respectively. The status messages may be received at random time intervals, at regular time intervals, or upon the occurrence of a predetermined event. Information regarding the one or more status messages may be stored in memory 304 for later use in calculating a simplified security/energy status. The status indication device typically operates in an energy-conservation mode of operation during this time, e.g., user interface 306 is not illuminated and/or processor 302 does not analyze or perform calculations related to information contained in the status messages.

At block 502, the status indication device monitors for the presence of an individual within range of the status indication device. Any one or a combination of technologies may be used to make this determination. For example, the status indication device may comprise a motion sensor, IR detector, camera, microphone, and/or supporting circuitry/software/firmware to make the determination, as is well-known in the art.

At block 504, the status indication device determines that an individual has been detected within range of the status indication device. Typically, processor 302 receives information from one or more motion-detection sensors (e.g., IR sensor, camera, passive IR, microphone, etc.) and provides the information to processor 302, where processor 302 performs an analysis of the signals received from the one or more sensors in accordance with processor-executable instructions stored in memory 304. In another embodiment, the one or more sensors comprise an on-board processor for detecting the presence of an individual and provide a signal indicative of such detection to processor 302.

The status indication device may determine that an individual has been detected within range of the status indication device in any of the ways described with respect to block 402 of FIG. 4.

At block 506, processor 302 determines a simplified security status of either security system 100, energy management system 200, or both. A simplified security status regarding security system 100 may comprise a determination that none of the sensors are reporting an "open" status, e.g., all doors and windows are closed, in which case the simplified security status comprises an "all closed" status. The simplified security status may, alternatively, comprise a determination that none of the one or more doors and/or windows are unlocked open, e.g., all of the monitored doors and/or windows are locked, in which case the simplified security status comprises an "all locked" status. In another embodiment, the simplified security status regarding security system 100 may comprise a determination that at least one door and/or window is open, in which case the simplified security status comprises a "not closed" status. In yet another embodiment, the simplified security status may comprise a determination that at least one door and/or window is unlocked. In another embodiment, the simplified security status comprises a combination of the two just-mentioned conditions, e.g., a determination that all monitored doors and/or windows are closed/not closed and a determination that all monitored doors and/or windows are locked.

A simplified energy status regarding energy management system may comprise a determination that a heating and/or cooling system is on, off, or in one or more predetermined modes, such as "automatic" or "energy conservation". It should be understood that the "on" determination may be made even though the heating/cooling system is not currently active. For example, a heating system may be in a thermostat-controlled "automatic" state, but not blowing warm air at the time when a status message is transmitted to the status indication device, because the ambient air temperature exceeds a thermostat set point. Processor 302 may determine the simplified energy status using information in the last message that was received from each device, such as the present operating status of one or more energy-consuming devices (e.g., heating, cooling, on, off, automatic, etc.), one or more parameters associated with one or more energy-consuming devices such as one or more thermostat set points and/or set times (e.g., times when an energy-consuming device will turn on, off, or be placed into an automatic state of operation), a sensed operating condition (such as an ambient air temperature, an oven temperature, an iron temperature, etc.).

In response to determining that an individual has been detected within range of the status indication device, at block 508, processor 302 provides the simplified status (security and/or energy) to user interface 306. For example, in one embodiment, processor 302 provides one or more electronic signals that cause one or more LEDs to illuminate or become extinguished. Alternatively, or in addition, processor 302 provides electronic signals that cause an audio output to be generated by user interface 306 indicative of the simplified security/energy status.

In one embodiment, user interface 306 comprises a red LED and a green LED, each indicative of a simplified security status of security system 100. Processor 302 causes the green LED to become illuminated if all doors and windows monitored by sensors are closed, and causes the red LED to become illuminated if one of the monitored doors or windows is open. In another embodiment, user interface 306 comprises a red LED, a yellow LED, and a green LED, each indicative of a simplified energy status of energy management system 200. Processor 302 causes the green LED to become illuminated if at least a portion of energy-consuming devices are operating in an "energy conservation" mode of operation, causes the red LED to become illuminated if at least a portion of the energy-consuming devices are off, and the yellow LED to become illuminated if at least a portion of the energy-consuming devices is operating in a "normal" mode of operation. Of course, many other configurations are possible, using different numbers and types of visual/audio presentation devices.

At block 510, processor 302 receives a signal from user interface 306 from an individual who wishes to cause one or more sensors or devices to perform one or more actions or functions. For example, an individual may, in response to seeing a green LED illuminated on the status indication device indicating that all doors and windows are closed, press a button on the status indication device that generates a signal indicative of the user's intentions.

At block 512, processor 302 generates one or more messages that are sent to one or more sensors and/or devices to cause them to perform a particular action or function. For example, a message may be generated by processor 302 and transmitted to set thermostat 208 to a predetermined set point of 68 degrees F. in the winter months so that ambient room temperature does not exceed 68 degrees and/or closing or opening electronically-controlled blinds or window shades, turning lights on or off, etc.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for providing a home energy status by a status indication device, comprising:
    determining, by a processor coupled to a detector, that an individual is leaving an area;
    in response to determining that the individual is leaving the area, determining, by the processor, a home energy status; and
    displaying, by the processor via a user interface coupled to the processor, the home energy status.

2. The method of claim 1, further comprising:
    receiving, by the processor via the user interface, an indication from the individual for an energy management device wirelessly coupled to the status indication device to perform an action;
    generating, by the processor, a message instructing the energy management device to perform the action in response to receiving the indication; and
    sending, by the processor via the transmitter, the message to the energy management device.

3. The method of claim 1, wherein the home energy status comprises an indication that a first energy-consuming device is in an energy conservation mode of operation.

4. The method of claim 1, wherein determining a home energy status comprises:
    transmitting, by the processor via a transmitter coupled to the processor, a request to a first energy control device that monitors a first energy-consuming device and to a second energy control device that monitors a second energy-consuming device, wherein the request comprises a request for the first and second energy management devices to report a status of the first energy-consuming device and the second energy-consuming device, respectively;
    wherein the home energy status is based on the status of the first energy-consuming device and the status of the second energy-consuming device.

5. A method performed by a home energy status indication device for providing a home energy status, comprising:
    determining, by a processor coupled to a detector, that an individual is leaving an area;
    in response to determining that the individual is leaving the area, sending, by the processor coupled to a transmitter, a status request to an energy control module, the energy control module for controlling operation of an energy-consuming device;
    receiving, by the processor coupled to a receiver, a response from the energy control module comprising an energy status of the energy-consuming device being controlled by the energy control module; and providing, by the processor coupled to a user interface, an indication of the home energy status based on the response from the energy control module.

6. The method of claim 5, further comprising:
receiving, by the processor via a user interface coupled to the processor, an indication from the individual for the energy-consuming device to enter into a first mode of operation;
generating, by the processor, a message instructing the energy control module to enter into the first mode of operation in response to receiving the indication; and
sending, by the processor via the transmitter, the message to the energy control module.

7. The method of claim 5, wherein the home energy status comprises an indication from the energy control module that the energy-consuming device is in an energy-saving mode of operation.

8. The method of claim 5, further comprising:
receiving, by the processor via the receiver, a second response from a second energy control module comprising a second energy status of a second energy-consuming device being controlled by the second energy control module; and
wherein the home energy status is based on the response from the energy control module and the second response from the second energy control module.

9. The method of claim 5, wherein determining that an individual is leaving an area comprises:
detecting, by the processor via the detector, that the individual is moving in a direction towards the status indication device.

10. The method of claim 9, wherein determining that an individual is leaving an area comprises:
determining, by the processor, that an entry door in proximity to the status indication device has opened within a predetermined time period from detection of the individual moving towards status indication device.

11. A home energy status indication device, comprising:
a detector for determining when an individual is leaving an area;
a user interface for displaying a home energy status to the individual;
a memory for storing processor-executable instructions; and
a processor electronically coupled to the detector, the user interface and the memory that, when executing the processor-executable instructions, causes the home energy status indication device to:
determine, by the processor via the detector, that the individual is leaving the area;
in response to determining that an individual is leaving the area, determine, by the processor, the home energy status of a home; and
display, by the processor via the user interface, the home energy status.

12. The home energy status indication device of claim 11, further comprising:
a transmitter coupled to the processor;
wherein the instructions that cause the home energy status indicator to determine the home energy status comprises instructions that cause the home energy status indication device to:
receive, by the processor via the user interface, an indication from the individual for an energy control module wirelessly coupled to the home energy status indication device to perform an action;

generate, by the processor, a message instructing the energy control module to perform the action in response to receiving the indication; and
send, by the processor via the transmitter, the message to the energy control module.

13. The home energy status indication device of claim 11, wherein the home energy status comprises an indication that a first energy-consuming device is in an energy conservation mode of operation.

14. The home energy status indication device of claim 11, further comprising:
a transmitter coupled to the processor;
wherein the instructions that cause the home energy status indicator to determine a home energy status comprises instructions that cause the home energy status indication device to:
transmit, by the processor via the transmitter, a request to a first energy control device that monitors a first energy-consuming device and to a second energy control device that monitors a second energy-consuming device, wherein the request comprises a request for the first and second energy management devices to report a status of the first energy-consuming device and the second energy-consuming device, respectively;
wherein the home energy status is based on the status of the first energy-consuming device and the status of the second energy-consuming device.

15. A home energy status indication device for providing a home energy status, comprising:
a detector for determining when an individual is leaving an area;
a user interface for displaying a home energy status to the individual;
a memory for storing processor-executable instructions;
a transmitter for transmitting wireless signals to one or more energy control modules;
a receiver for receiving wireless signals from one or more energy control modules; and
a processor electronically coupled to the detector, the user interface and the memory that, when executing the processor-executable instructions, causes the home energy status indication device to:
determine, by a processor coupled to a detector, that an individual is leaving an area;
in response to determining that the individual is leaving the area, send, by the processor via the transmitter, a status request to a first energy control module, the first energy control module for controlling operation of a first energy-consuming device;
receive, by the processor via the receiver, a response from the first energy control module, the response comprising an energy status of the first energy-consuming device controlled by the first energy control module; and
providing, by the processor coupled to a user interface, an indication of the home energy status based on the response from the first energy control module.

16. The home energy status indication device of claim 15, wherein the processor-executable instructions comprise further instructions that causes the home energy status indication device to:
receive, by the processor via the user interface, an indication from the individual for a first of the energy-consuming devices to enter into a first mode of operation;

generate, by the processor, a message instructing the first energy control module to enter into the first mode of operation in response to receiving the indication; and sending, by the processor via the transmitter, the message to the first energy control module.

17. The home energy status indication device of claim 15, wherein the home energy status comprises an indication from a first energy control module that a first energy-consuming device is in an energy-saving mode of operation.

18. The home energy status indication device of claim 15, wherein the processor-executable instructions comprise further instructions that causes the home energy status indication device to:

receive, by the processor via the receiver, a second response from a second energy control module comprising a second energy status of a second energy-consuming device being controlled by the second energy control module; and wherein the home energy status is based on the response from the first energy control module and the second response from the second energy control module.

19. The home energy status indication device of claim 15, wherein the instructions that cause the home energy status indicator to determine that the individual is leaving the area comprises instructions that cause the home energy status indication device to:

detect, by the processor via the detector, that the individual is moving in a direction towards the home energy status indication device.

20. The home energy status indication device of claim 19, wherein the instructions that cause the home energy status indicator to determine that the individual is leaving the area comprises instructions that cause the home energy status indication device to:

determine, by the processor, that an entry door in proximity to the status indication device has opened within a predetermined time period from detection of the individual moving towards status indication device.

* * * * *